United States Patent

Jouppi et al.

(10) Patent No.: US 6,879,879 B2
(45) Date of Patent: Apr. 12, 2005

(54) TELEPRESENCE SYSTEM WITH AUTOMATIC USER-SURROGATE HEIGHT MATCHING

(75) Inventors: Norman Paul Jouppi, Palo Alto, CA (US); Vaughan Stanton Thomas, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 194 days.

(21) Appl. No.: 10/285,757

(22) Filed: Oct. 31, 2002

(65) Prior Publication Data

US 2004/0088078 A1 May 6, 2004

(51) Int. Cl.[7] .......................... G05B 15/00; G05B 19/00
(52) U.S. Cl. ................... 700/259; 700/245; 700/246; 700/250; 700/251; 700/257; 700/258; 700/259; 700/262; 348/159; 982/103
(58) Field of Search ................. 700/245, 246, 700/250, 251, 253, 257–259, 262; 348/159; 382/103

(56) References Cited

U.S. PATENT DOCUMENTS

| | | | |
|---|---|---|---|
| 6,292,713 B1 | | 9/2001 | Jouppi et al. |
| 6,666,374 B1 | * | 12/2003 | Green et al. ............... 235/379 |
| 6,726,096 B1 | * | 4/2004 | Green et al. ............... 235/379 |
| 6,726,476 B1 | * | 4/2004 | Jung et al. ................. 433/26 |
| 6,727,935 B1 | * | 4/2004 | Allen et al. ............. 348/14.03 |
| 6,785,402 B1 | * | 8/2004 | Jouppi et al. ............. 382/103 |
| 2002/0057279 A1 | * | 5/2002 | Jouppi ....................... 345/619 |
| 2002/0063726 A1 | * | 5/2002 | Jouppi ....................... 345/660 |
| 2002/0118861 A1 | * | 8/2002 | Jouppi et al. ............. 382/103 |
| 2002/0173877 A1 | * | 11/2002 | Zweig ........................ 700/245 |
| 2003/0209893 A1 | * | 11/2003 | Breed et al. ............... 280/735 |
| 2003/0210329 A1 | * | 11/2003 | Aagaard et al. ........... 348/159 |
| 2004/0008423 A1 | * | 1/2004 | Driscoll et al. ........... 359/725 |
| 2004/0088077 A1 | * | 5/2004 | Jouppi et al. ............. 700/245 |
| 2004/0088078 A1 | * | 5/2004 | Jouppi et al. ............. 700/245 |
| 2004/0117067 A1 | * | 6/2004 | Jouppi ....................... 700/245 |

OTHER PUBLICATIONS

Jouppi, First steps towards mutually–immersive mobile telepresence, 2002, Internet, pp. 1–10.*

Kusuoka et al., Dual ecologies of robot as communication media: Thoughts on coordinating orientations and projectability, 2004, Internet, pp. 183–190.*

Jouppi et al., A first generation mutually–immersive mobile telepresence surrogate with automatic backtracking, 2004, IEEE, pp. 1670–1675.*

HP Labs: News, BiReality Audio–Video Demo, First steps toward a mutually immersive mobile telepresence, 2002, Internet, pp. 1–2.*

Braunl et al., Improv and EyeBot real–time vision on–board mobile robots, 1997, IEEE, pp. 131–135.*

Lobo et al., Integration of inertial information with vision towards robot autonomy, 1997, IEEE, pp. 825–830.*

* cited by examiner

Primary Examiner—Thomas G. Black
Assistant Examiner—McDieunel Marc (57) ABSTRACT

A method and system for mutually-immersive telepresencing includes determining a height of a user and monitoring a height of an image of the user on an adjustable height surrogate. The method includes transmitting the height of the user and the image of the user, and moving the height of the image of the user on the adjustable height surrogate towards the height of the user.

22 Claims, 7 Drawing Sheets

| DETERMINING A HEIGHT OF A USER 902 |

| MONITORING A HEIGHT OF AN IMAGE OF A USER ON AN ADJUSTABLE HEIGHT SURROGATE 904 |

| TRANSMITTING THE HEIGHT OF THE USER AND THE IMAGE OF THE USER 906 |

| MOVING THE HEIGHT OF THE IMAGE OF THE USER ON THE ADJUSTABLE HEIGHT SURROGATE TOWARDS THE HEIGHT OF THE USER 908 |

TELEPRESENCE SYSTEM WITH AUTOMATIC USER-SURROGATE HEIGHT MATCHING

CROSS-REFERENCE TO RELATED APPLICATION

The present application also contains subject matter related to a concurrently filed U.S. Patent Application by Norman Paul Jouppi and Vaughan Stanton Thomas entitled "Mutually-Immersive Mobile Telepresence System with User Rotation and Surrogate Translation". The related application is assigned to Hewlett-Packard Development Company, L. P., is identified by Ser. No. 10/285,726, and is incorporated herein by reference thereto.

BACKGROUND

1. Technical Field

The present invention relates generally to robotics and more specifically to telepresence systems.

2. Background Art

In the past, video camera and audio systems were developed for improving communication among individuals who are separated by distance and/or time. The system and the process are now referred to as "videoconferencing". Videoconferencing sought to duplicate, to the maximum extent possible, the full range, level and intensity of interpersonal communication and information sharing which would occur if all the participants were "face-to-face" in the same room at the same time.

Behavioral scientists know that interpersonal communication involves a large number of subtle and complex visual cues, referred to by names like "eye contact" and "body language," which provide additional information over and above the spoken words and explicit gestures. These cues are, for the most part, processed subconsciously by the participants, and often communicate information, which cannot be communicated in any other fashion.

In addition to spoken words, demonstrative gestures, and behavioral cues, face-to-face contact often involves sitting down, standing up, and moving around to look at objects or charts. This combination of spoken words, gestures, visual cues, and physical movement significantly enhances the effectiveness of communication in a variety of contexts, such as "brainstorming" sessions among professionals in a particular field, consultations between one or more experts and one or more clients, sensitive business or political negotiations, etc. In situations where the participants cannot be in the same place at the same time, the beneficial effects of face-to-face contact will be realized only to the extent that each of the remotely located participants can be "recreated" at each site.

Although videoconferencing has come into widespread use, it is still of limited use because of the inability to very closely approximate for a user the recreation of the remotely located participants. The systems generally use fixed location cameras and conference-type telephones. There is no sense of the presence of the user being at the site of a remote meeting or of the presence of the remotely located participants being with the user.

To overcome these problems, a system called "robotic telepresence" has been developed. In robotic telepresence, a remotely controlled robot simulates the presence of the user for the remotely located participants. The user has a freedom of motion and control over the robot and video input that is not present in traditional videoconferencing, and this better simulates the feeling of the user being present in person at a remote site. The overall experience for the user and the people interacting with the robotic telepresence device is very much superior to videoconferencing.

The robot platform typically includes a camera, a display device, a motorized platform that includes batteries, a control computer, and a wireless computer network connection. An image of the user is captured by a camera at the user's location and displayed on the display of the robotic telepresence device in the remote site.

In a previous approach, a robotic device was built on a remote controlled car. However, driving the car remotely was considerably more difficult than personally walking through the same area. The robotic device used a single small camera with a relatively small field of view and low resolution. This device shared problems with videoconferencing in that the user had "tunnel vision." The user was not provided with a peripheral view of the environment as compared to human peripheral vision. In addition, the central resolution of the remote camera was much lower than that of the human eye, which made it difficult to remotely read anything other than very large text.

The robotic device displayed the user's image on a small LCD screen about three inches tall, which did not move independently of the robotic platform. This display did not provide an appearance of eye contact between the remote user and others interacting with the remote user via the robot. The lack of eye contact makes it difficult for people to relate naturally to the person using the robotic device.

More recently, a robotic telepresence system has been developed, which has a user station at a first geographic location and a robot at a second geographic location. The user station is responsive to a user and communicates information to and from the user. The robot is coupled to the user station and provides a three dimensional representation of the user transmitted from the user station. The robot also senses predetermined types of information and communicates the sensed information back to the user to provide a three dimensional representation of the user. As a result of the three dimensional representation, eye contact between the user and others interacting with the robot at the remote location is improved.

However, there are many problems that still need to be addressed to provide improved robotic telepresence realism; i.e., to make the user appear to be present in person. One situation that has been noted is that, during human interactions, the sitting or standing position of people conveys information to other people and it is desirable to replicate the user's position. However, there are two problems. First, a mechanism is required for accurately measuring the height of the user's head in a non-invasive fashion. Second, a mechanism is required for mechanically adjusting the head height of the robotic device.

Solutions to problems of this sort have been long sought, but have long eluded those skilled in the art.

DISCLOSURE OF THE INVENTION

The present invention provides a method and system for mutually-immersive telepresencing including determining a height of a user and monitoring a height of an image of a user on an adjustable height surrogate. The method includes transmitting the height of the user and the image of the user, and moving the height of the image of the user on the adjustable height surrogate towards the height of the user to improve robotic telepresence realism.

Certain embodiments of the invention have other advantages in addition to or in place of those mentioned above.

The advantages will become apparent to those skilled in the art from a reading of the following detailed description when taken with reference to the accompanying drawings.

BEST MODE FOR CARRYING OUT THE INVENTION

The present invention relates to a Mutually-Immersive Mobile Telepresence (E-Travel) System. The user sits in front of a display showing the remote location and a robot device is located at a remote location having a display of the user. Video and audio are transmitted between the display and the robot device. The robot device may have a humanoid as well as a non-humanoid shape, and is referred to as a "surrogate".

During human interactions, the sitting or standing position of people conveys information to other people. For example, during business meetings, people typically sit in chairs while only the presenter stands. However, at the conclusion of meetings everyone usually stands up and visits with each other in small groups. As another example, when a person visits someone in their office, the visitor is initially standing and the office occupant is sitting. The person who is visiting may be asked to sit down by the office occupant, or may do so themselves depending on the context. In general people find it awkward to be standing while others are sitting or vice-versa. Thus, it is desirable for the user to conform to the sitting or standing position of other people in both a business and social context.

During human interactions, height is important to people. If given a choice, people generally prefer to be taller, as witnessed by such devices as high-heel shoes and kids standing on tiptoes for family portraits. Studies have shown that taller people tend to earn higher salaries, and that all of the US presidents in the last century except for one have been of taller than average height. Although most people are comfortable with their own height, people do not like to be perceived by others as being much shorter than they actually are. Thus a second goal of the invention is to preserve the actual height of a user of a telepresence system.

Figure 1:
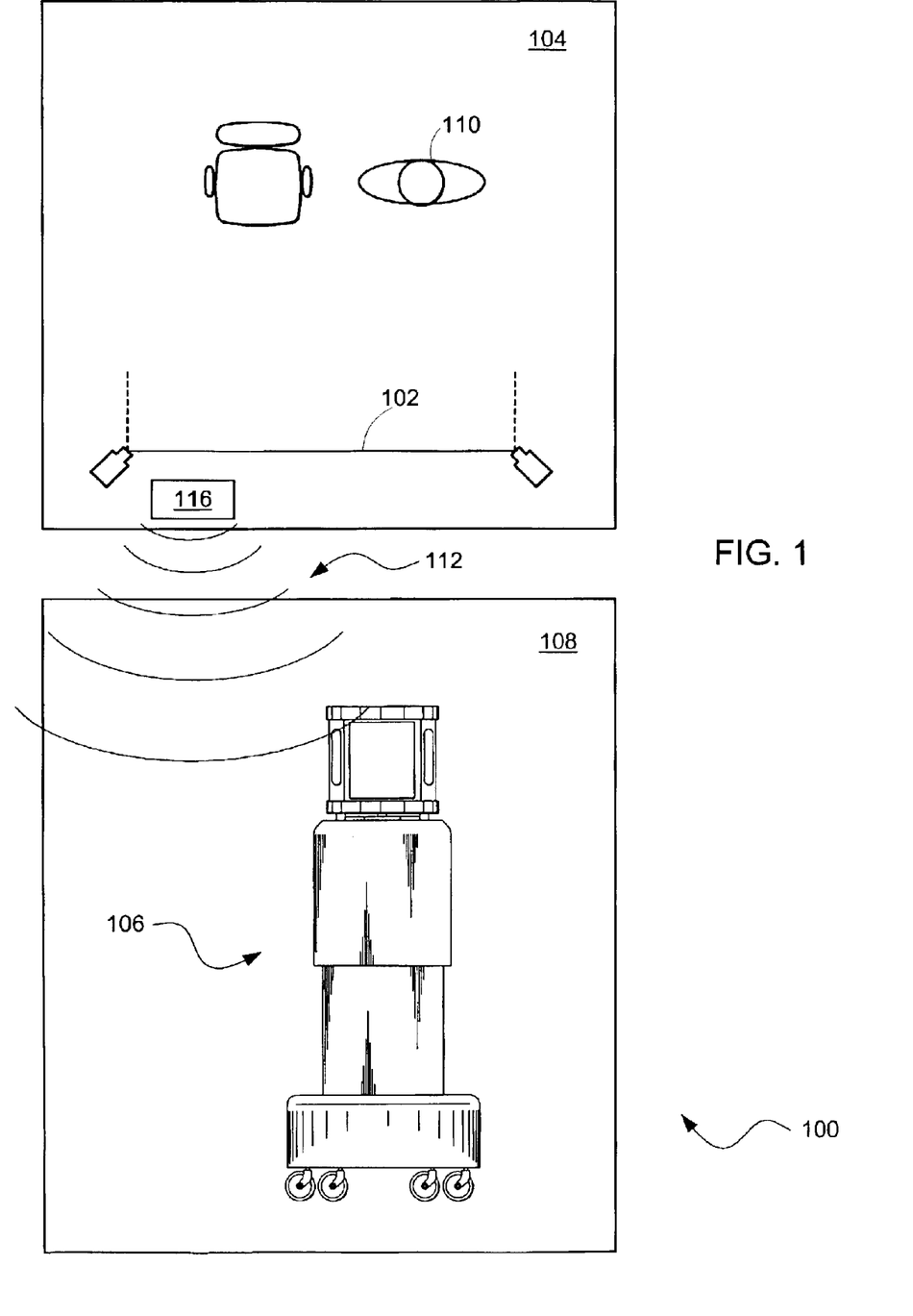
FIG. 1 is an overview of a Mutually-Immersive Mobile Telepresence System.

Referring now to FIG. 1, therein is shown a Mutually-Immersive Mobile Telepresence System 100. The system 100 includes a user's display 102 at a user's location 104 and a robotic device or a surrogate 106 at a surrogate's location 108.

A user 110 may sit or stand in front of the user's display 102. The surrogate 106 is connected to the user's display 102 via a high-speed network 112 through a user's computer 116.

Figure 2:
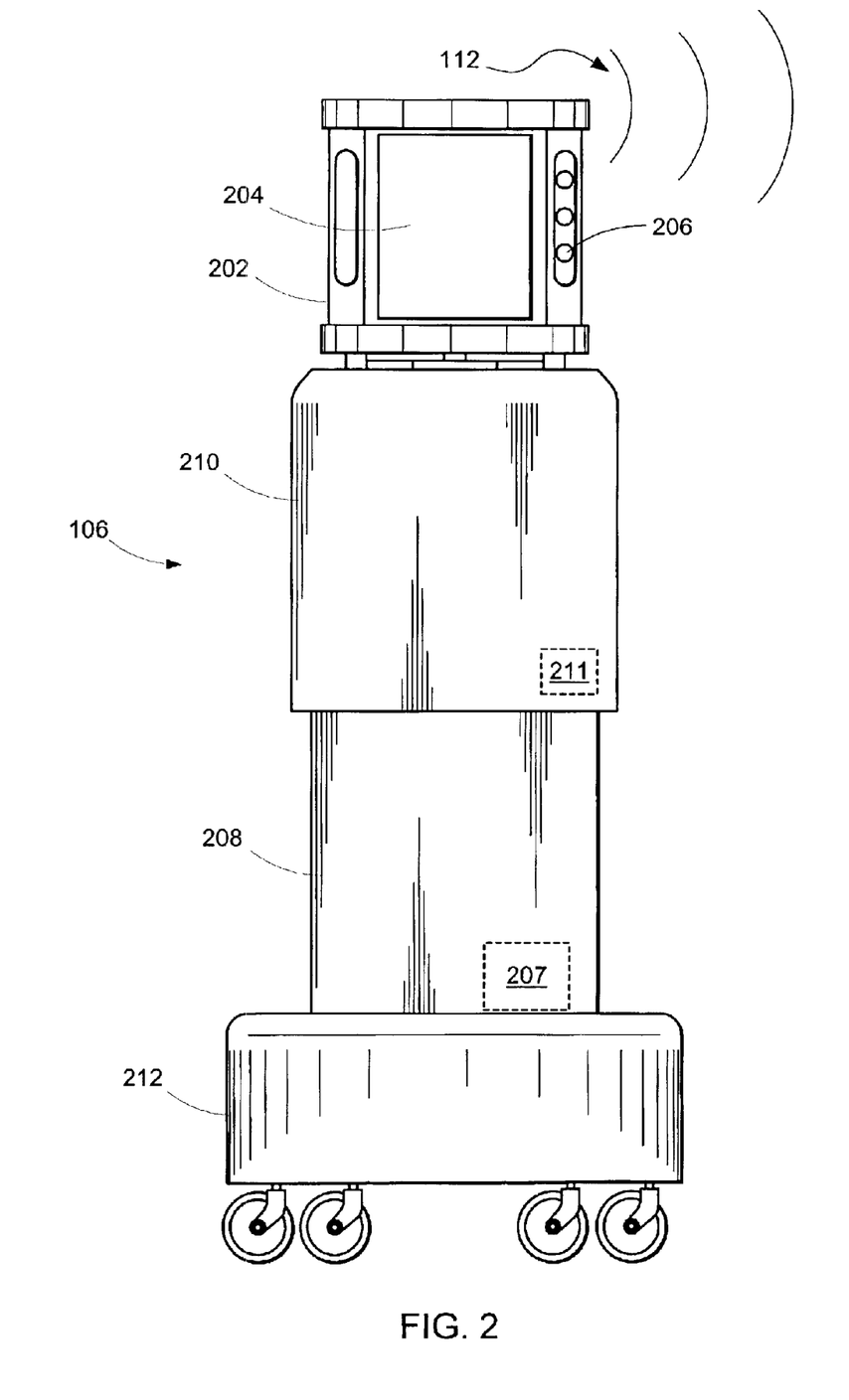
FIG. 2 is a surrogate in accordance with the present invention.

Referring now to FIG. 2, therein is shown the surrogate 106 in accordance with the present invention. The surrogate 106 has a surrogate's head 202 made with one or more surrogate's face displays 204, which could be made of one or more LCD panels. One or more surrogate's cameras 206 in the surrogate's head 202 capture live video at the surrogate's location 108. The video from the surrogate's cameras 206 in the surrogate's head 202 is compressed and transmitted over the high-speed network 112 by a surrogate's computer 207 in the surrogate 106 to the user's computer 116 (shown in FIG. 1) at the user's location 104.

The surrogate 106 is made in two parts, which are movable relative to each other. One part is a leg portion 208 and one part is a torso portion 210. A monitor 211 is connected to the surrogate's computer 207 to sense the extension or height of the torso portion 210 relative to the leg portion 208. The surrogate's head 202 is mounted above the torso portion 210, and the torso portion 210 may be raised or lowered relative to the leg portion 208 so as to raise or lower the surrogate's head 202 relative to the surface on which the surrogate 106 moves or is moved. The surrogate 106 includes a drive portion 212.

Figure 3:
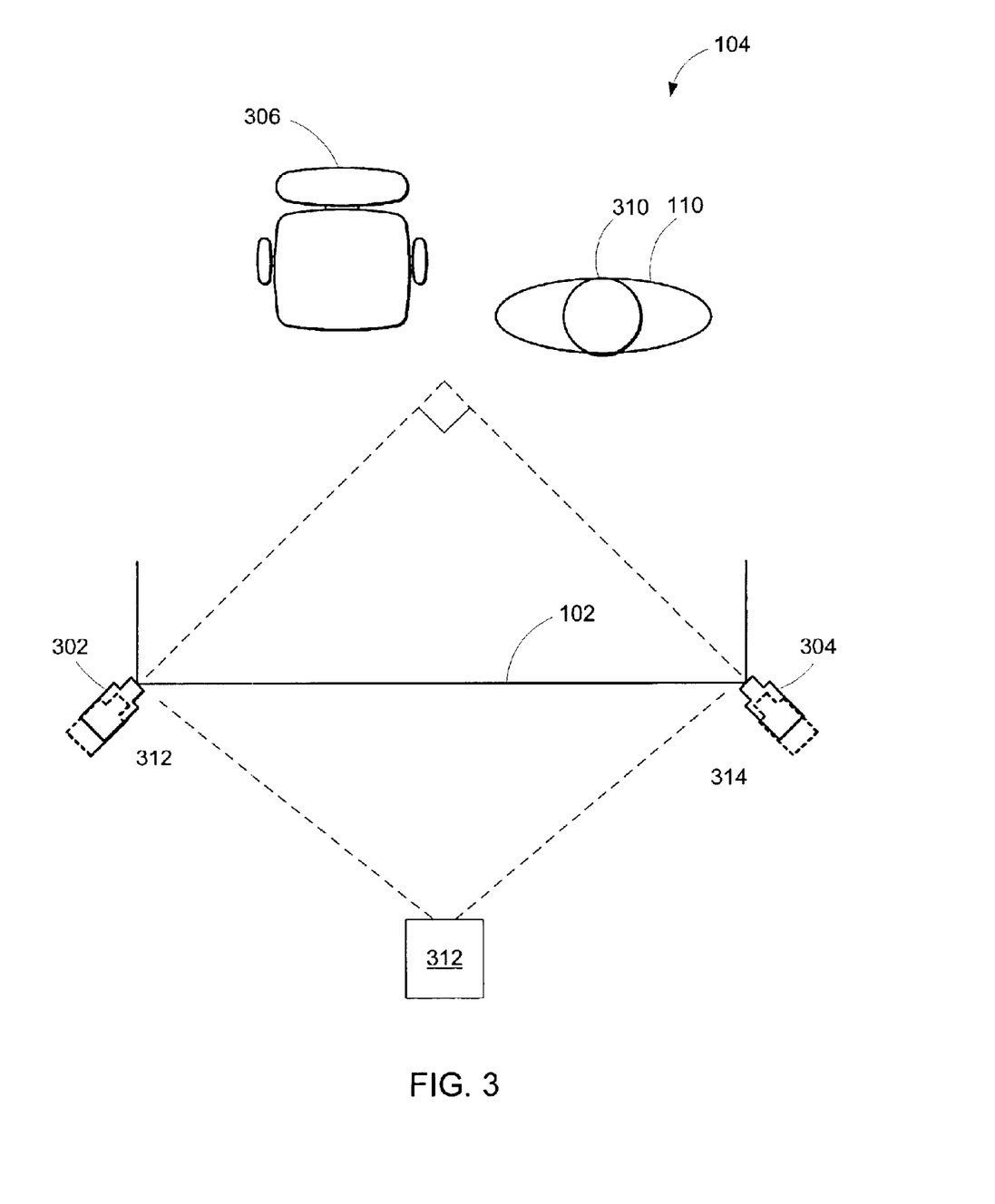
FIG. 3 is a user's location having the user's display with cameras.

Referring now to FIG. 3, therein is shown the user's location 104 having the user's display 102 with first and second cameras 302 and 304, a chair 306, and a user's head 310.

A projector 312 projects the video from the surrogate's cameras 206 of FIG. 2 onto the user's display 102. Similarly, the surrogate's computer 207 (in FIG. 2) also receives live video from the first and second cameras 302 and 304 of the user's bead 310 from the user's computer 116 (in FIG. 1) at the user's location 104. The video of the user's head 310 is displayed on the surrogate's face displays 204 (in FIG. 2).

In order to have the surrogate's face display 204 maintain a height where eye contact can be easily maintained, it has been discovered that matching the height of the user's head 310 automatically results in a natural surrogate height in a telepresence system.

It was also discovered that the height of the user's head 310 above a floor could be determined by using one of several techniques, which would automatically set a user's sitting and standing heights.

In one technique, a camera is placed on each side of the user's display 102, such as the first and second cameras 302 and 304. The cameras are set at an angle of 90 degrees relative to each other, pointing towards the user in front of the user's display 102. The user's image is then surrounded in the image outputs of the first and second cameras 302 and 304 with a chroma-key blue background. With the angle between the cameras and the field of view of the images known, the vertical height of the user's head 310 can be determined via triangulation.

In another technique, first and second near-infrared (NIR) cameras 312 and 314 respectively positioned below the first and second cameras 302 and 304 are used for tracking the user's head 310 using near-infrared difference keying and similar triangulation techniques applied. The near-infrared radiation from the user's head 310 stands out from the previously stored background image so it can be easily detected.

The above techniques and their applicability to the present invention would be obvious to those having ordinary skill in the art based on the disclosure given above.

Figure 4:
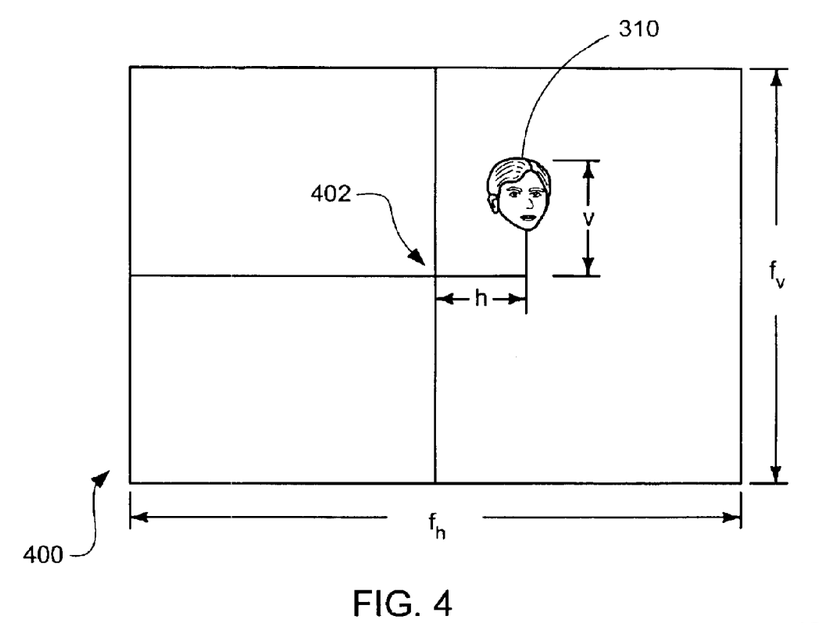
FIG. 4 is a view from one of the cameras.

Referring now to FIG. 4, therein is shown the view from one of the cameras mounted beside the user's display 102. The camera can either be video cameras or NIR cameras.

The combination of camera and lens determines the overall vertical ($f_v$) and horizontal ($f_h$) fields of view in the video. Based on this and the position of the user's head 310 in the frame, the horizontal (h) and vertical (v) angles can be computed between the top center of the user's head 310 and an optical center of an image 402. From this, the height of the user's head 310 can be computed.

Figure 5:
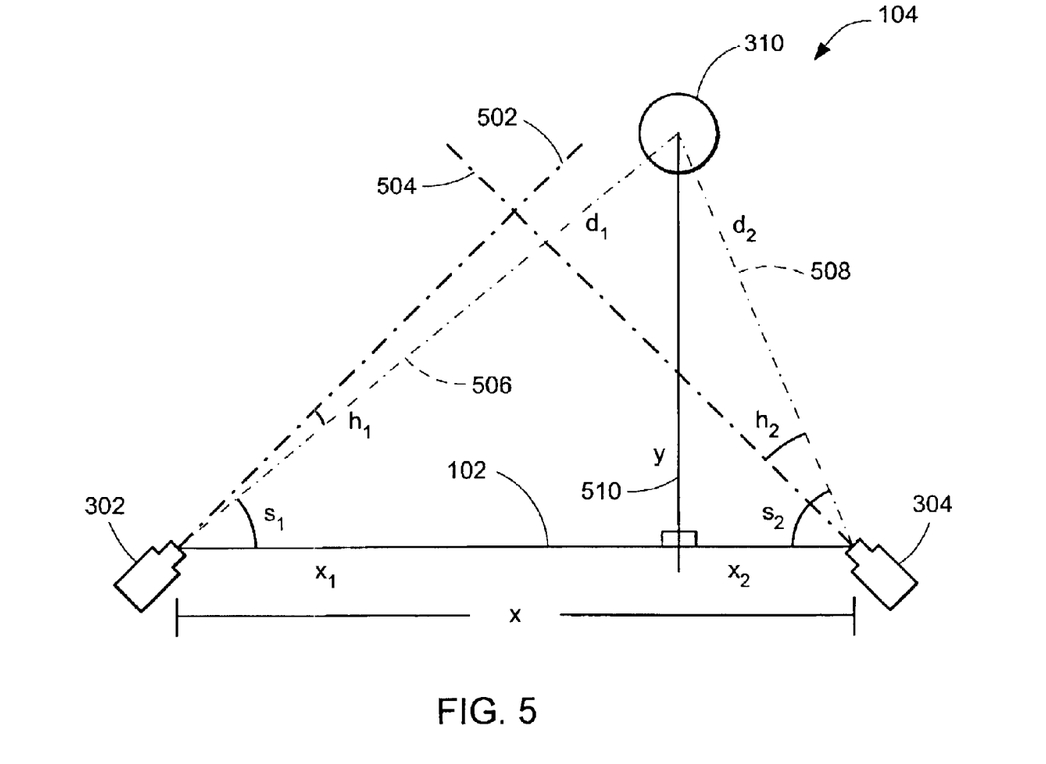
FIG. 5 is a view of the user's location looking down from above.

Referring now to FIG. 5, therein is shown the user's location 104 looking down from above. In this embodiment, the first and second cameras 302 and 304 are used as an example. The distance between the first and second cameras 302 and 304 is known as are angles $h_1$ and $h_2$ between centerlines 502 and 504 of sight of the first and second cameras 302 and 304 and centerlines 506 and 508 respectively to the user's head 310. It is also known that the first and second cameras 302 and 304 have the centerlines 502 and 504 set relative to each other; e.g., 90 degrees. If the first and second cameras 302 and 304 are angled at 45 degrees relative to the user's display 102, the angles between the user's display 102 and the centerlines 506 and 508 to the user's head 310 are $S_1=45-h_1$ and $s_2=45+h_2$. From trigonometry:

$$x_1 * \tan S_1 = y = x_2 * \tan s_2 \qquad \text{Equation 1}$$

and $$x_1 + x_2 = x \qquad \text{Equation 2}$$

so $$x_1 * \tan s_1 = (x - x_1) * \tan s_2 \qquad \text{Equation 3}$$

regrouping $$x_1 * (\tan S_1 + \tan S_2) = x * \tan s_2 \qquad \text{Equation 4}$$

solving for $x_1$ $$x_1 = (x * \tan s_2)/(\tan S_1 + \tan S_2) \qquad \text{Equation 5}$$

and knowing either $x_1$, or $x_2$, compute y.

(To reduce errors, compute 510 from both and take the average value.)

Then the distances from each camera to the user can be computed as follows:

$$d_1 = y/\sin s_1 \qquad \text{Equation 6}$$

$$d_2 = y/\sin S_2 \qquad \text{Equation 7}$$

Figure 6:
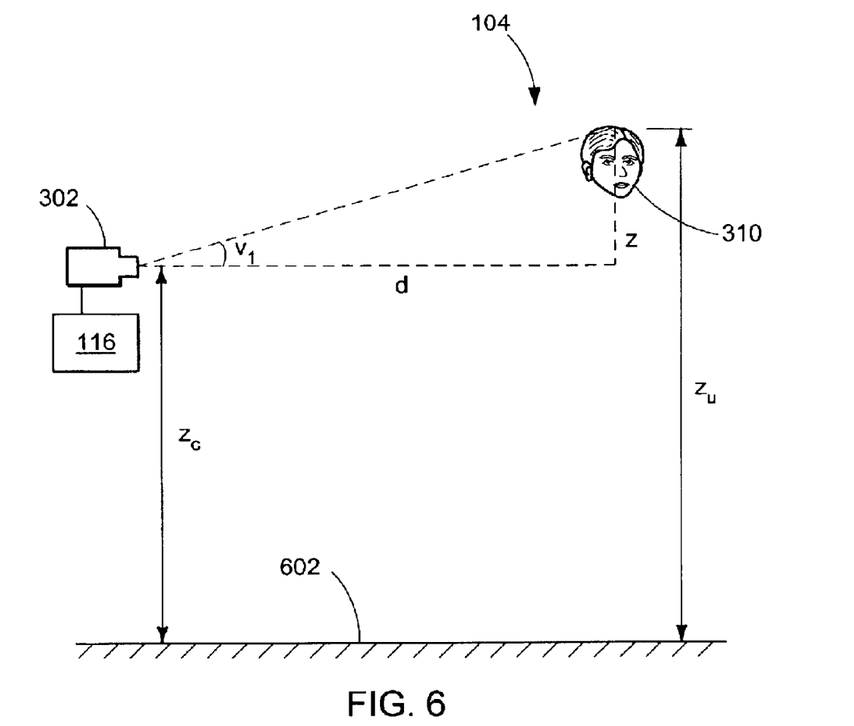
FIG. 6 is a diagram for computing the height of the top of the user's head from a floor.

Referring now to FIG. 6, therein is shown a diagram 600 for computing the height of the top of the user's head 310 from a floor 602:

The overall height of the user's head 310 ($z_u$) is the sum of the height ($z_c$) of one camera plus the height above the camera (z). The distance to the user and the vertical angle $v_1$, from the camera image is known. The camera is level.

From trigonometry:

$$d_1 * \tan v_1 = z = d_2 * \tan v_2 \qquad \text{Equation 8}$$

To minimize the error, the average height is computed based on the vertical angles from the two cameras:

$$z = (d_1 * \tan v_1 + d_2 * \tan v_2)/2 \qquad \text{Equation 9}$$

and $$z_u = z_c + z \qquad \text{Equation 10}$$

Figure 7:
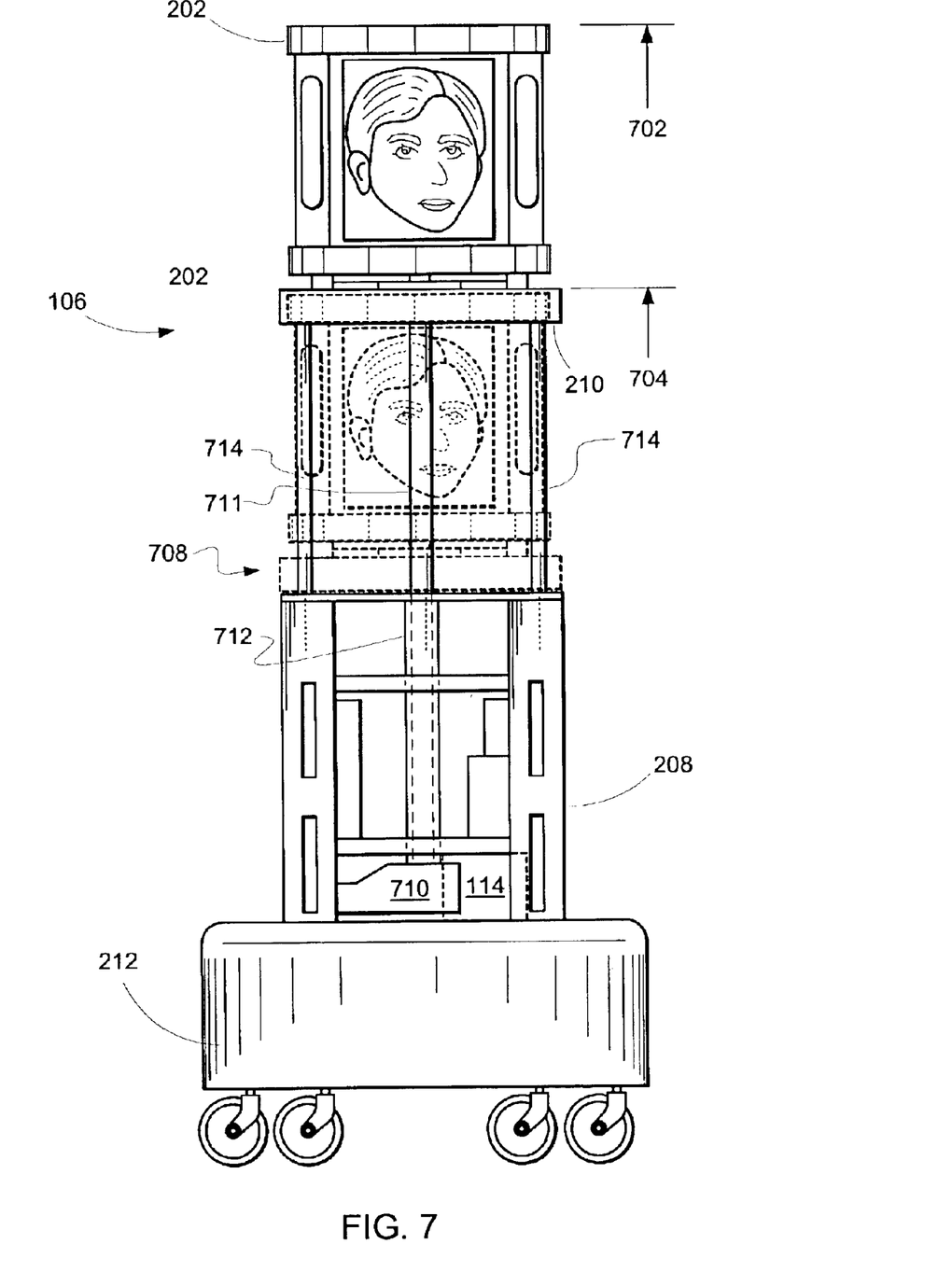
FIG. 7 is the surrogate 106 in two positions with a head lift mechanism based on a linear actuator mechanism.

Referring now to FIG. 7, therein is shown the surrogate 106 in two positions where the height of the surrogate's head 202 to matches the height of the user's head 310 of FIG. 3 in a standing position 702 and a seated position 704.

The surrogate 106 receives the vertical height of the user's head 310 from the user's computer 116 at the user's location 104 (shown in FIG. 6). The surrogate's computer 207 monitors the height of the user's image in the surrogate's head 202 and then raises or lowers the surrogate's head 202 so that the video image of the user's head 310 is at the same vertical height as the user's head 310 at the user's location 104.

The surrogate's computer 207 recreates the same height by measuring the current extension of the surrogate's body, knowing the position of the top of the user's head in the displayed video, and then increasing or decreasing the surrogate's extension so the height of the image of the user's head matches the user's actual head height. It will be understood that matching height would also include the possibility of introducing a height factor to make the surrogate's height to be greater or lesser than, or varying from the user's actual height for psychological, viewing, or other reasons.

There are a number of different mechanisms, which can be used to extend and contract the surrogate's body by extending or contracting the torso portion 210 (shown exposed in FIG. 7) relative to the leg portion 208.

In the embodiment shown in FIG. 7, a linear actuator mechanism 708 is used to raise and lower the surrogate's head 202 and the torso portion 210 relative to the leg portion 208. The linear actuator mechanism 708 includes a motor 710 and a piston 711 in a jacket 712. Guide rods 714 (two shown) in four corners of the torso portion 210 help to guide the surrogate's head 202 and the torso portion 210 but do not bear the weight of these portions.

The head lift mechanism based on the linear actuator mechanism 708 has the advantages of simplicity and easy construction. However it only offers a limited range of 18 inches, and since it lifts the surrogate's head 202 only at its center the surrogate's head 202 can be wobbly.

Figure 8:
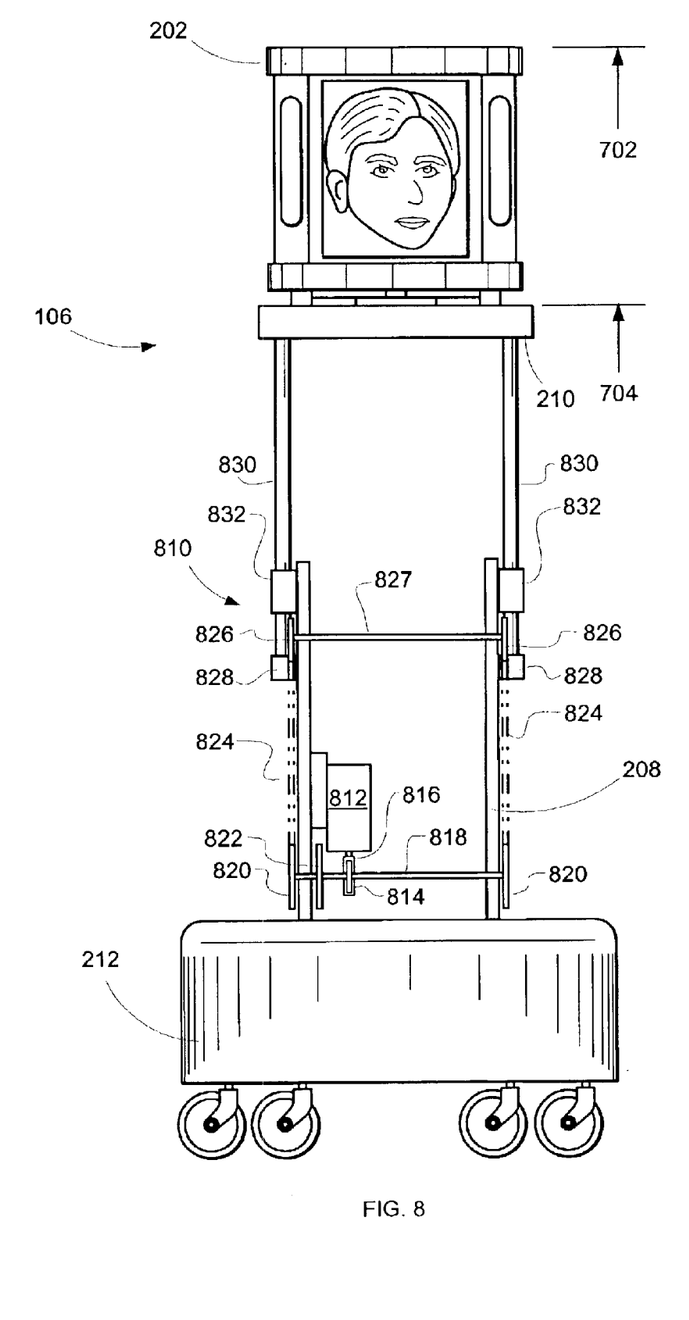
FIGS. 8 and 9 are another head lift mechanism based on a motor and chain drive system.
Figure 9:
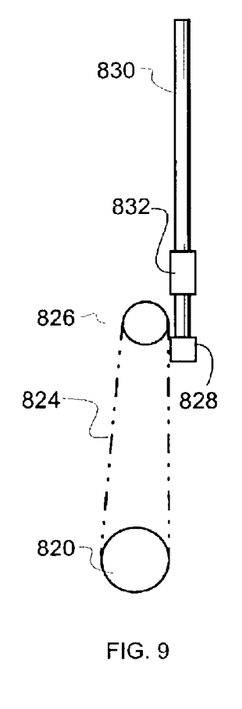

Referring now to FIGS. 8 and 9, therein are shown another head lift mechanism based on a motor and chain drive system 810, which can raise and lower the surrogate's head 202 over a range of two feet or more. A motor 812 on the leg portion 208 drives a worm 814 to turn a worm gear 816 on a primary axle 818. The primary axle 818 turns drive sprockets 820. The drive sprockets 820 have drive chains 824 driving driven sprockets 826 on an axle 827.

The primary axle 818 also has a sprocket 822 carrying a drive chain to a sprocket on a secondary axle. The secondary axle also has two drive sprockets with chains driving two driven sprockets. This second set of sprockets and chains is not visible because it is directly behind the primary axle 818, the drive sprockets 820, the drive chains 824, and the driven sprockets 826 and is not visible.

Referring now to FIG. 9, therein is shown a side view of one part of the four corner parts that make up the motor and chain drive system 810. The drive sprocket 820 has the drive chain 824 driving the driven sprocket 826. A connector 828 connects a support rod 830 to the drive chain 824 to lift a corner of the surrogate's head 202. The support rod 830 moves in a guide block 832. When the four support rods 830 are all raised or lowered in tandem the surrogate's head 202 and upper body of the surrogate 106 are evenly raised and lowered.

The motor and chain drive system 810 is more complicated and more difficult to implement than the linear actuator mechanism 708 of FIG. 7, but overcomes the disadvantages of the linear actuator mechanism 708. The motor and chain drive system 810 supports the surrogate's head 202 at all four corners, greatly reducing the potential wobble of the surrogate's head 202.

The head lift mechanisms are capable of covering the whole range of heights from a sitting short person to that of a standing tall person. Since some people are exceptionally tall or short, the surrogate's range of motion may be limited to covering only a large percentage of all people in order to simplify the design and reduce its cost.

Figure 10:
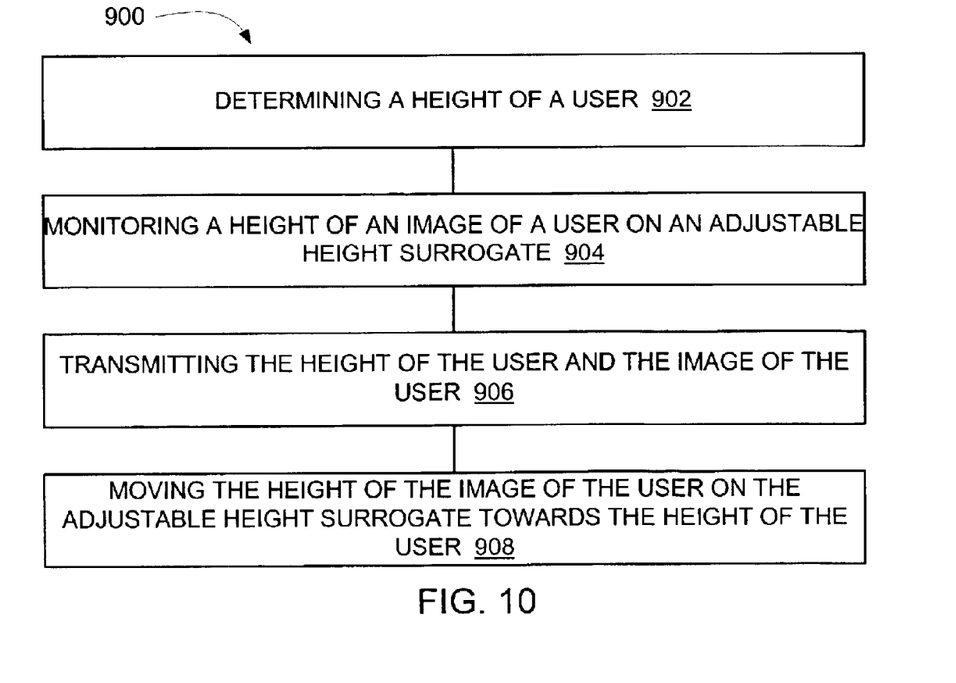
FIG. 10 is a method for mutually-immersive telepresencing.

Referring now to FIG. 10, therein is shown a method 900 for mutually-immersive telepresencing including: a step 902 of determining a height of a user; a step 904 of monitoring a height of an image of a user on an adjustable height surrogate; a step 906 of transmitting the height of the user and the image of the user; and a step 908 of moving the height of the image of the user on the adjustable height surrogate towards the height of the user.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the spirit and scope of the included claims. All matters hither-to-fore set forth herein or shown in the accompanying drawings are to be interpreted in an illustrative and non-limiting sense.

The invention claimed is:

1. A method for mutually-immersive telepresencing comprising:
  determining a height of a user;
  monitoring a height of an image of a user on an adjustable height surrogate;
  transmitting the height of the user and the image of the user; and
  moving the height of the image of the user on the adjustable height surrogate towards the height of the user.

2. The method as claimed in claim 1 wherein:
  determining the height of a user includes:
    using the head of the user.

3. The method as claimed in claim 1 wherein:
  determining the height of the user includes:
    using a camera;
    calculating how far the user is from the camera, and
    calculating the height of the user based on how far the user is from the camera and the height of the user relative to a height of the camera.

4. The method as claimed in claim 1 wherein:
  determining the height of the user includes:
    using a pair of cameras; and
    processing images from the pair of cameras to locate the head of the user.

5. The method as claimed in claim 1 wherein:
  determining the height of the user includes:
    introducing a height factor to modify the height of the image of the user on the surrogate.

6. A method for mutually-immersive telepresencing comprising:
  determining a height of a user using a camera system;
  monitoring a height of an image of a user on an adjustable height surrogate using a sensor;
  transmitting the height of the user and the image of the user over a high-speed network; and
  matching the height of the image of the user on the adjustable height surrogate and the height of the user.

7. The method as claimed in claim 6 wherein:
  determining the height of a user includes:
    using the head of the user to establish the height of the user.

8. The method as claimed in claim 6 wherein:
  determining the height of the user includes:
    using the camera system with a pair of cameras;
    triangulating how far the user is from the pair of cameras, and
    triangulating the height of the user based on how far the user is from the pair of cameras and the height of the user relative to an average height of the pair of cameras.

9. The method as claimed in claim 6 wherein:
  determining the height of the user includes:
    using the camera system with a pair of cameras; and
    processing images from the pair of cameras to locate the head of the user using a technique selected from a group consisting of chroma-keying and near-infrared difference keying.

10. The method as claimed in claim 6 wherein:
  determining the height of the user includes:
    introducing a height factor to vary the match between the height of the user and the height of the image of the user on the surrogate.

11. A mutually-immersive telepresencing system comprising:
  a system for determining a height of a user;
  a system for monitoring a height of an image of a user on an adjustable height surrogate;
  a system transmitting the height of the user and an image of a user; and
  a system for moving the height of the image of the user on adjustable height surrogate towards the height of the user.

12. The mutually-immersive telepresencing system as claimed in claim 11 wherein:
  the system for determining the height of a user includes:
    a system for using the head of the user.

13. The mutually-immersive telepresencing system as claimed in claim 11 wherein:
  the system for determining the height of the user includes:
    a camera;
    a system for calculating how far the user is from the camera, and
    a system for calculating the height of the user based on how far the user is from the camera and the height of the user relative to a height of the camera.

14. The mutually-immersive telepresencing system as claimed in claim 11 wherein:
  the system for determining the height of the user includes:
    a pair of cameras; and
    a system for processing images from the pair of cameras to locate the head of the user.

15. The mutually-immersive telepresencing system as claimed in claim 11 wherein:
  the system for determining the height of the user includes:
    adjustments for introducing a height factor to modify the height of the image of the user on the surrogate.

16. The mutually-immersive telepresencing system as claimed in claim 11 wherein:
  the system for moving the height of the image of the user on the adjustable height surrogate towards the height of the user includes a system selected from a group consisting of a linear actuator mechanism and a motor and chain drive system.

17. A mutually-immersive telepresencing system for automatic user-surrogate height matching comprising:
- a system for determining a height of a user using a camera system;
- a system for monitoring a height of an image of a user on an adjustable height surrogate using a sensor;
- a system for transmitting the height of the user and the image of the user over a high-speed network; and
- a system for matching the height of the image of the user on the adjustable height surrogate and the height of the user.

18. The mutually-immersive telepresencing system as claimed in claim 17 wherein:
- the system for determining the height of a user includes:
  - a system for using the head of the user to establish the height of the user.

19. The mutually-immersive telepresencing system as claimed in claim 17 wherein:
- the system for determining the height of the user includes:
  - the camera system having a pair of cameras;
  - a computer for triangulating how far the user is from the pair of cameras, and
  - the computer for triangulating the height of the user based on how far the user is from the pair of cameras and the height of the user relative to an average height of the pair of cameras.

20. The mutually-immersive telepresencing system as claimed in claim 17 wherein:
- the system for determining the height of the user includes:
  - the camera system having a pair of cameras; and
  - a system processing images from the pair of cameras to locate the head of the user using a technique selected from a group consisting of chroma-keying and near-infrared difference keying.

21. The mutually-immersive telepresencing system as claimed in claim 17 wherein:
- the system for determining the height of the user includes:
  - an adjustment for introducing a height factor to vary the match between the height of the user and the height of the image of the user on the surrogate.

22. The mutually-immersive telepresencing system as claimed in claim 17 wherein:
- the system for matching the height of the image of the user on the adjustable height surrogate and the height of the user includes a system selected from a group consisting of a linear actuator mechanism and a motor and chain drive system.

* * * * *